United States Patent Office 3,211,153
Patented Oct. 12, 1965

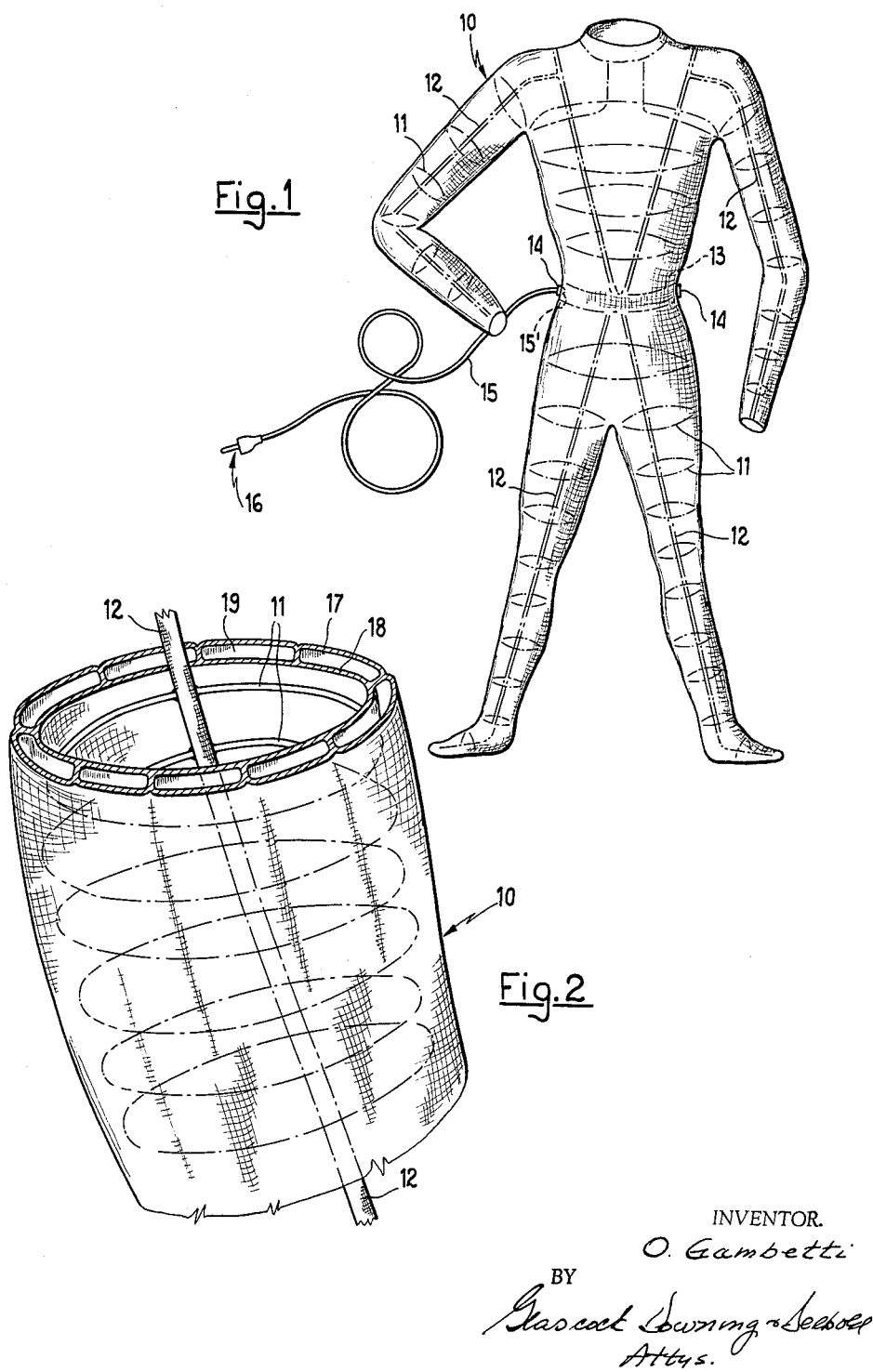

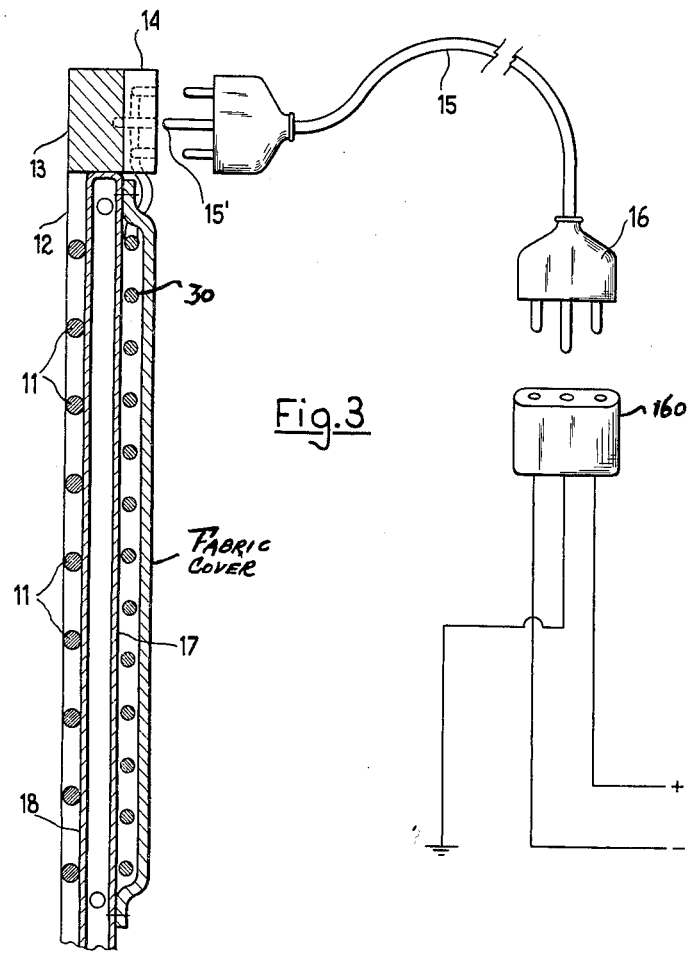

3,211,153
ANTI-ELECTROSTATIC GARMENT
Oreste Gambetti, 2 Via Cinta, Cento, Ferrara, Italy
Filed Nov. 8, 1961, Ser. No. 151,006
5 Claims. (Cl. 128—379)

This invention relates to an improved anti-electrostatic garment construction, it being understood that use of such a term relates to an article of dress or, in any event, a means adapted to enclose or to enwrap, wholly or partly, the human body. More particularly, the garment construction of the invention is designed to ensure a permanent and substantially total electrical connection of the body or portion of the human body, covered by such garment, with the ground or with a structure at zero potential.

More particularly, it is a object of the invention to provide an article of dress adapted to cover and enclose the whole human body, such as an overall, or one which encloses a portion of the human body as, for instance, the bust, a limb, or in case of partial and localized treatments one which is adapted to allow the performance of health recovering cures. Thus, the garment of the invention is one which is to act on biological unbalance conditions that affect the human body organs, and in which sweating phenomena occurs, for instance, during treatments for preventing or decreasing of morbid rheumatic ailments, in connection with weight reducing programs and for eliminating localized obesity or the like, and which simultaneously is adapted to ensure the zeroing of electrostatic charges which might exist or might develop during such treatments.

It is known that the medical and therapeutic tendencies must consider the fact of the electric and electrostatic balance phenomena that exist in the human body. More particularly, positive electrostatic charges are now considered, if not the first cause, as an outstanding fact correlated with morbid phenomena which affect the human nervous system and the human digestive system with resultant possible adverse effects on the different human biological functions.

It is further known and widely accepted in the art that it is necessary to keep the human body, within the limits of possibility, in electrical connection with ground (this latter being considered as being a body of boundless capacity, therefore being able to absorb substantially any electrostatic charge) in order to prevent antagonistic conditions of electric charge in the human body.

Obviously the said possible harmful states of electrostatic lack of compensation take up a special meaning and importance when the human body is being subjected to treatments which enhance the biological phenomena, for instance, in the case of treatments which bring about a conspicuous diaphoretic activity. As typical examples of these treatments are to be mentioned weight reducing treatments, which are brought into effect by giving rise to a copious sweating of the body, artificially heated and/or enclosed thoroughly or partly inside sweat-insulating and waterproof overalls so as to prevent thermal exchange with the surrounding atmosphere; antirheumatic treatments, and the like.

It is therefore an object of this invention to solve certain problems involved in the provision of anti-electrostatic garment means which, in combination, are adapted to thoroughly or partially enclose the human body in the conditions needed for performing treatments of the type referred to above, and which includes means adapted to place the human body or a portion thereof, enclosed therein, in constant and whole connection with ground, so as to ensure the zeroing of any electrostatic charges, especially of positive charges, which already exist or which can arise or increase during the treatment.

Consequently, it is a specific object of the present invention to provide an antielectrostatic garment which includes an inner human skin contacting surface adapted to be placed against at least a substantial portion of the body surface of the wearer in direct skin contacting engagement therewith, and which garment further comprises exposed electrically conductive means carried by said inner surface and including a plurality of primary conductor elements secured to the inner surface of the garment means in exposed condition and extending generally transversely of the portion of the body with which they are to be in contact and mounted in a multiplicity of axially spaced locations. Further, the garment includes secondary conductor elements also mounted in exposed relation on said inner skin contacting surface of the garment so that they are to be in direct contact with the skin. All of the primary conductor elements are electrically interconnected with the secondary conductor elements and the secondary conductor elements extend axially of the portion of the body contacted thereby. There is a ring-type electric charge collecting element incorporated in the garment and on the inner skin contacting surface thereof. The secondary conductor elements are electrically connected with said ring-type collecting conductor and at least one terminal incorporated with said ring-type collector element. To complete the garment, there is a cable conductor having terminals at opposite ends. One of the terminals is electrically connected with the terminal in the ring-type collector and the other terminal is adapted for connection to ground whereby with the garment in use and said other terminal connected to ground, the major portions of the skin of the wearer are directly grounded so as to zero any electrostatic charge existing in the body of the wearer.

The essential features of the invention for obtaining said effects will best be understood from the following detailed description of a form of embodiment of the anti-electrostatic garment of the invention, reference being made to the accompanying drawings, wherein:

FIG. 1 perspectively and diagrammatically illustrates a complete overall garment constructed in accordance with the invention.

FIG. 2 shows in perspective and in sectional view a portion of said overall (for instance a leg portion thereof), adapted for treatments including a huge delivery of thermal energy and FIG. 3 is a fragmentary diagrammatic view partly in section illustrating certain details of a garment constructed in accordance with the invention.

As shown in FIG. 1 the inner surface, according to the substantial feature of the garment of the invention, designated with numeral 10, is made electroconducting, at least on areas relatively near, and all of the conductive zones are interconnected so as to achieve an electric continuity over substantially the whole extent of the garment, with a point which may be connected with the ground.

For instance, the inner human skin contacting surface of the garment can constitute textile material, the structure including pliable metallic threads or wires having sufficient flexibility and interwoven thereinto or of a textile material impregnated or covered with a composition including a metallic component such as a metal powder, primary conductors designated with numeral 11 are placed which transmit the electrostatic charges collected on the surface of the human body and which, in turn, through secondary collecting conductors 12, and through a final ring-type collector 13, are electrically connected with a terminal 14, which through a plug 15' at one end of a cable conductor 15 and a connection plug 16, may be directly connected with a ground circuitry.

Allowing for the fact that such treatments are mainly carried out under medical control and in well-equipped rooms, the connecting means may be made up of a single one-pole plug which may be plugged in a socket provided in a ground circuit. Of course said means may be replaced by a clamp or a metal band so as to be tied, in good electrically conductive relationship, with a portion, for instance, of the water supply piping or other metal structure assuring a positive grounding.

The garment or portion of a garment having said electric connecting means may be, in turn, so realized as to allow in the epidermis the thermal increase needed for giving rise to the required sweating event. For instance, the piece of clothing may be realized of a thermo-insulating textile, or may be made up of several layers including thermo-insulating gaps. As shown by way of example in FIG. 2, the garment may be formed with spaced inner and outer portions or walls 17 and 18, between which are provided suitably intercommunicating cells 19 which are adapted to accommodate a hot liquid or fluid means, say suitably heated water, hot air or the like. Inside the same textile are provided electric resistors such as at 30 of a proper cross-section and to limit the heating within a range of values of absolute safety, said resistors being duly protected and insulated. In this case, the conductive means 15 (FIG. 1) and connecting plug 16 may be used for the electric connection, through insulated wires of the heating circuit with the local electric supply and of the grounding wire which, in the modern electric supply wirings, is associated with the same electric sockets such as 160, see FIG. 3. In other words, in this form of the invention the garment is a double wall garment having cells to accommodate or circulate therethrough a heat exchange fluid such as water or air. The electrical charge collectors which would include the rings 11, the axially extending conductors 12, and the collecting band 13 are also provided in the garment. The heating unit that is of the electric resistance type, as is known in the art, would be incorporated in one of the textile walls of the garment and have its insulated wires, and an electrical connection with a socket or terminal of the three-aperture type provided on the band 13. One aperture of this terminal would be in conductive relationship with the band, and the cable conductor would have three prong plugs at each end, so that one end is plugged into the socket on the band, and the other end plugged into a three plug receptacle in a building supply system current which would flow into the electrical resistance heating portion of the garment, and any electrical charge built up on the surface of the wearer would be directly grounded through the grounding circuitry including collector rings 11, conductors 12, the ring-type collector 13, the terminal on this collector, and the cable having the three-prong plugs at each end.

It is further to be pointed out in connection with the garment of the invention that the inner human skin contacting surface as shown in FIG. 1 is advantageously composed of arm, leg and torso encircling portions with the primary conductor elements 11 exposed on the inner surface at a plurality of points along the arm, leg and torso portions. The secondary conductor element 12 extends axially of each arm and leg portion and of the torso portion and are connected to adjacent primary conductor elements. The ring-type conductor 13 is exposed on the inner surface of the torso portion of the garment at the waist level thereof.

The same principle of associating a means thoroughly or partly covering the human body with a means fit to ensure that the body is placed and kept in electrical connection with the ground, according to the invention, may be extended to products which cannot be considered as true garments, thus, thermo-insulating and thermo-electric blankets, hot-water bags and the like.

Therefore, said means having as an object to provide a thermal protection and particularly a surface overheating of at least a portion of the human body, it being accompanied by sweating, when provided with means adapted to place the epidermis in electrical ground connection, are to be included within the scope of the present invention as defined by the appended claims.

What I claim is:

1. In an anti-electrostatic garment including an inner human skin contacting surface adapted to be placed against at least a substantial portion of the body surface of the wearer in direct skin contacting engagement therewith, the improvements comprising exposed electrically conductive means carried by said inner surface and including a plurality of primary conductor elements secured to the inner surface of the garment means in exposed condition, extending generally transversely of the portion of the body with which they are in contact and mounted in a multiplicity of axially spaced locations, secondary conductor elements also mounted in exposed relation on said inner skin contacting surface of the garment so as to be in direct contact with the skin, all said primary conductor elements being electrically interconnected with said secondary conductor elements, said secondary conductor elements extending axially of the portion of the body of the wear contacted thereby, a ring-type electric charge collecting element incorporated in the garment and on the inner skin contacting surface thereof, said secondary conductor elements being electrically connected with said ring-type collecting conductor, at least one terminal incorporated with said ring-type collector element, a cable conductor having terminals at opposite ends, one of the terminals of the cable conductor being electrically connected with said terminal in the ring-type collector element and the other terminal of the cable conductor being adapted for connection to ground whereby with the garment in use and said other terminal connected to ground the major portions of the skin of the wearer are directly grounded so as to zero any electrostatic charge existing in the body.

2. A garment as claimed in claim 1 and in which said inner human skin contacting surface constitutes textile material and pliable metallic wires interwoven thereinto and constituting said first-mentioned electrically conductive means exposed at a plurality of spaced locations.

3. A garment as claimed in claim 1 and said inner human skin contacting surface constituting textile material and impregnated with a composition including a metallic component.

4. The garment as claimed in claim 1, in which said inner human skin contacting surface is composed of arm, leg and torso encircling portions, said primary conductor elements being exposed on said surface at a plurality of points along each arm and leg portion and the torso portion, said secondary conductor elements extending axially of each arm and leg portion and of the torso portion and connected to adjacent primary conductor elements, and said ring-type collecting conductor being exposed on the inner surface of the torso portion of the garment at the waist level thereof.

5. In an anti-electrostatic garment, garment means including spaced inner and outer portions, heat exchange means located between said spaced inner and outer portions, said inner portion constituting an inner human skin contacting surface adapted to be placed against at least a substantial portion of the body surface of the wearer in direct skin contacting engagement therewith, exposed electrically conductive means carried by said inner surface and including a plurality of primary conductor elements secured to the inner surface of the garment means in exposed condition, extending generally transversely of the portion of the body with which they are in contact and mounted in a multiplicity of axially spaced locations, secondary conductor elements also mounted in exposed relation on said inner skin contacting surface of the garment so as to be in direct contact with the skin, all said primary conductor elements being electrically interconnected with said secondary conductor elements, said secondary conductor elements extending axially of the portion of the body of the wearer contacted thereby, a ring-type electric charge collecting element incorporated in the garment and on the inner skin contacting surface thereof, said secondary conductor elements being electrically connected with said ring-type collecting conductor, at least one terminal incorporated with said ring-type collector element, a cable conductor having terminals at opposite ends, one of the terminals of the cable conductor being electrically connected with said terminal in the ring-type collector element and the other terminal of the cable conductor being adapted for connection to ground whereby with the garment in use and said other terminal connected to ground the major portions of the skin of the wearer are directly grounded so as to zero any electrostatic charge existing in the body.

References Cited by the Examiner

UNITED STATES PATENTS

| | | | |
|---|---|---|---|
| 1,691,472 | 11/28 | Graham | 128—379 X |
| 1,889,271 | 11/32 | Zerne | 128—418 X |
| 2,494,987 | 1/50 | Chaitin | 128—379 |
| 3,011,172 | 12/61 | Tames | 2—114 X |

RICHARD A. GAUDET, *Primary Examiner.*

RICHARD J. HOFFMAN, LOUIS R. PRINCE,
*Examiners.*